United States Patent
Goto et al.

[11] Patent Number: 6,044,278
[45] Date of Patent: Mar. 28, 2000

[54] METHOD AND APPARATUS FOR MESSAGE COMMUNICATION

[75] Inventors: Hiroyuki Goto, Hino; Ryuichi Miyamoto, Hachiouji, both of Japan

[73] Assignee: Kabushiki Kaisha Toshiba, Kanagawa, Japan

[21] Appl. No.: 08/936,737

[22] Filed: Sep. 25, 1997

[30] Foreign Application Priority Data

Sep. 26, 1996 [JP] Japan .................................. 8-254579

[51] Int. Cl.[7] .................................................. H04B 1/38
[52] U.S. Cl. ........................................... 455/553; 455/466
[58] Field of Search ........................... 455/466, 88, 552, 455/553, 74, 38.2, 38.5, 66

[56] References Cited

U.S. PATENT DOCUMENTS

| | | | |
|---|---|---|---|
| 5,335,355 | 8/1994 | Tanaka et al. | 455/553 |
| 5,404,579 | 4/1995 | Obayashi et al. | 455/553 |

*Primary Examiner*—Lee Nguyen
*Attorney, Agent, or Firm*—Finnegan, Henderson, Farabow, Garrett & Dunner, L.L.P.

[57] ABSTRACT

In a message communication in which communication of message data is effected between a calling terminal and a called terminal connected to each other through an integrated services digital network, control information indicative of message communication is added in the calling terminal to the call setting information transmitted to the integrated services digital network when originating a call to a called terminal; in the called terminal, the call setting information received from the integrated services digital network is analyzed; when it is determined that control information is not added to the call setting information, it switches to a voice mode to effect voice communication with the called terminal after responding to the call setting information; when control information is added to the call setting information, it switches to the message mode to automatically receive message data transmitted from the called terminal after responding to the call setting information.

19 Claims, 7 Drawing Sheets

METHOD AND APPARATUS FOR MESSAGE COMMUNICATION

BACKGROUND OF THE INVENTION

1. Field of the Invention

The present invention relates to method and apparatus for message communication, and particularly to method and apparatus for message communication with an improved operability for message communication by adding information indicative of message communication to call setting information transmitted from a calling terminal connected to an integrated services digital network when a call is originated, and by switching the called terminal to a message mode according to this information.

2. Description of the Related Art

Recently, apparatuses capable of performing message communication in addition to usual voice communication with PHS (personal handyphone system), etc., have been proposed in Japan.

The message communication is a communication in which predetermined message data or message data input through a keypad is transmitted from a calling terminal to a called terminal, and the transmitted message data is displayed on a display in the called terminal.

The procedure of a conventional message transmission in a PHS, etc., capable of performing the message communication is as follows.

1) Select predetermined message data or prepare message data through operation of a keypad on the calling terminal.
2) Input the telephone number of the called terminal to effect call operation.
3) When the called terminal responds, tell the called terminal that the call is a message communication and ask the called terminal to switch the operation to the message reception mode.
4) Transmit the message data selected or prepared in 1).

As seen in the foregoing, the conventional message transmission procedure in a PHS, etc. requires the called terminal to manually switch its operation to the message reception mode after the called terminal responds to the incoming signal from the calling terminal. Therefore, the operations of effecting message communication are troublesome, and the problem is that message communication cannot be effected in such an event that nobody is present or no response is made at the called terminal because in such an event the called terminal cannot be switched to the message reception mode.

In order to resolve the problems, a system could be considered in which the called terminal automatically responds to the incoming signal from the calling terminal and switches its operation to the message reception mode. However, in such a system, the called terminal automatically responds to not only incoming signals for message communication but also incoming signals other than that for message communication, for example incoming signals for usual voice communication, so as to switch its operation to the message mode. This results in that the call is considered to be responded with a non-signal response and the caller has to pay this unnecessary calling charge.

SUMMARY OF THE INVENTION

Therefore, it is an object of the present invention to provide a method and apparatus for message communication with improved operability with a simple operation.

In one aspect of the present invention, a method for message communication in which communication of message data is effected between a calling terminal and a called terminal connected to each other through an integrated services digital network, is characterized in that the calling terminal adds control information indicating that message communication is effected to call setting information sent to the integrated services digital network when the message communication is effected between the calling terminal and the called terminal; and the called terminal analyzes the call setting information received from the integrated services digital network to find whether or not the control information is added to the call setting information, and switches its communication mode to a voice mode to effect voice communication with the called terminal after responding to the call setting information when the control information is not added to the call setting information, and switches its communication mode to the message reception mode to automatically receive the message data transmitted from the called terminal after responding to the call setting information when the control information is added to the call setting information.

This method may be so constructed as follows.

In the message mode to transmit message data from the calling party to the called terminal, the calling terminal converts the message data to a DTMF signal and transmits the DTMF signal to the called terminal; and the called terminal analyzes the DTMF signal received from the calling terminal and reconverts the DTMF signal to the message data.

The control information is set in a subaddress of the call setting information.

The control information includes first information to indicate whether or not automatic response is made to the call setting information; and the called terminal automatically responds to the call setting information when it is determined through analysis of the call setting information that the first information indicates that automatic response should be made.

The control information includes second information to indicate whether or not to make notification of an incoming signal in response to the reception of the call setting information; and the called terminal responds to the reception of the call setting information and makes notification of the incoming signal when it is determined through analysis of the call setting information that the second information indicates that notification of an incoming signal should be made in response to the reception of the call setting information, and prohibits the notification of the incoming signal when the second information indicates that notification of an incoming signal should not be made in response to the reception of the call setting information.

The notification of the incoming signal for the message communication is effected in a manner different from a manner for effecting the notification of an incoming signal for the voice communication.

The calling terminal is a mobile terminal connected through a radio channel to base station connected to the integrated services digital network.

The called terminal is a mobile terminal connected through a radio channel to the base station connected to the integrated services digital network.

In another aspect of the present invention, in a method for message communication in which communication of message data is effected between a calling terminal and a called terminal connected to each other through an integrated services digital network, the calling terminal adds control information indicating that message communication is effected to call setting information sent to the integrated services digital network when the message communication is effected between the calling terminal and the called terminal; the called terminal, upon receiving the call setting information from the integrated services digital network, transmits to the calling terminal an incoming call response informing that the call setting information is received, and switches its communication mode to the message reception mode to automatically receive message data sent from the calling terminal; the calling terminal, upon receiving the incoming call response from the called terminal, transmits message data to the called terminal, and switches its communication mode to the message reception mode; and the called terminal, after receiving the message data from the calling terminal, switches its communication mode to the message transmission mode and transmits message data to the calling terminal.

In still another aspect of the present invention, an apparatus for message communication connected to an integrated services digital network to effect the communication of message data via the integrated services digital network, comprises communication mode determining means for determining whether call setting information received from the integrated services digital network includes control information indicating that message communication is effected; and switching means for switching communication mode of the apparatus to a voice mode so as to generate a voice signal from information received from the integrated services digital network when the communication mode determining means determines that the control information is not included in the call setting information, and for switching the communication mode to a message mode to output the information received from the integrated services digital network as message data when it is determined that the control information is added.

This apparatus may be so constructed as follows.

The control information is set in a subaddress of the call setting information.

The message data is automatically received, stored in storage means and displayed on display means when the switching means switches the communication mode to the message mode.

The control information comprises first information for indicating that the call setting information is automatically responded, and wherein the apparatus further comprises means for automatically responding to the call setting information when the communication mode determining means determines that first information is included in the control information.

The control information comprises second information for indicating that notification of an incoming call is made in response to the call setting information, and wherein the apparatus further comprises notifying means for making notification of the incoming signal in response to the reception of the call setting information when the communication mode determining means determines that second information is included in the control information, and for prohibiting the generation of notification of the inclining signal when the communication mode determining means determines that second information is not included in the control information.

The apparatus for message communication is a mobile terminal connected through a radio channel to a base station connected to the integrated services digital network.

With the above-described construction of the present invention, message communication can be effected with a simple operation and the effect that the operability of message communication can be improved is made possible.

DESCRIPTION OF THE PREFERRED EMBODIMENTS

An embodiment of the method and apparatus for message communication according to the present invention is described in detail with reference to the appended drawings.

Figure 1:
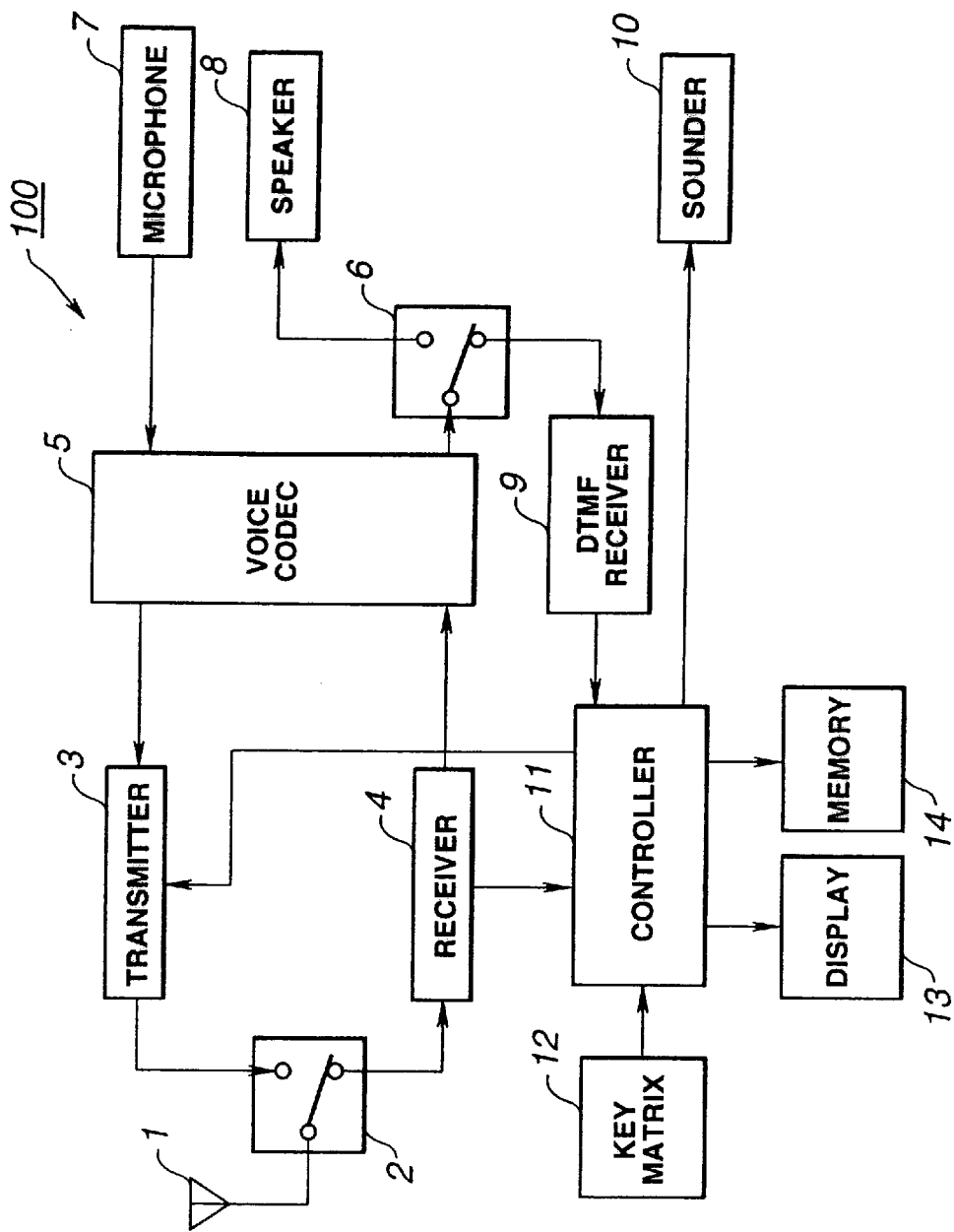
FIG. 1 is a block diagram illustrating a configuration of an embodiment of the apparatus for message communication according to the present invention.

FIG. 1 is a block diagram illustrating an embodiment of an apparatus for message communication according to the present invention. In this embodiment, mobile terminal of the PHS (personal handyphone system) is applied to the present invention.

In FIG. 1, the mobile terminal 100 comprises antenna 1, transmission/reception switch 2, transmitter 3, receiver 4, voice codec 5, mode switch 6, microphone 7, speaker 8, DTMF (dual tone multi-frequency) receiver 9, sounder 10, controller 11, key matrix 12, display 13, and memory 14.

The voice codec 5 converts the voice signal (analog signal) supplied from the microphone 7 to digital information and outputs this to the transmitter 3, while converting digital information received at the receiver 4 to a voice signal (analog signal) and outputting this to the mode switch 6.

The transmitter 3 effects transmission process to the digital information supplied from the voice codec 5, and the receiver 4 effects reception process to the digital information received through the antenna 1.

The microphone 7 serves as a telephone microphone to input the telephone voice signal, the speaker 8 serves as a telephone earphone to sound voice according to the received voice signal, and the sounder 10 gives notification of the reception of a call.

The sounder 10 may be constituted of a speaker to give notification of an incoming call with an incoming signal tone or a vibrator to give such notification by vibrating action.

The DTMF receiver 9 effects the reception process to a DTMF signal which is converted to a voice signal at the voice codec 5.

In this embodiment, message data is received as a DTMF signal as discussed in detail below, and the DTMF receiver 9 effects the reception process of message data that is constituted by the DTMF signal.

The controller 11 effects integrated control of all operations of the mobile terminal 100. The transmission/reception switch 2 and the mode switch 6 are switched with a signal, not shown, supplied from the controller 11.

The key matrix 12 has a plurality of keys, as discussed in detail below, and allows the input of various types of information. The display 13 displays the message data, etc. and the memory 14 stores the message data, etc.

In the voice mode in which the mode switch 6 is switched to the opposite side to that shown in FIG. 1 with the controller 11, voice corresponding to the reception signal received with the antenna 1 is sounded from the speaker 8, and the voice signal output from the microphone 7 is transmitted as the transmission signal through the antenna 1.

Specifically, the reception signal received with the antenna 1 is input to the voice codec 5 via the transmission/reception switch 2 and the receiver 4. The voice codec 5 converts the reception signal to a voice signal, inputs it to the speaker 8 via the switch 6 to sound it as voice.

The voice signal output from the microphone 7 is input to the voice codec 5 where it is converted to a digital signal, which in turn is transmitted from the antenna 1 via the transmitter 3 and the transmission/reception switch 2.

In the message mode to effect message communication, the mode switch 6 is switched to a position as shown in FIG. 1 with the controller 11 and the signal received through the antenna 1 is input to the voice codec 5 via transmission/reception switch 2 and receiver 4. The voice codec 5 outputs message data constituted by a DTMF signal. The message data is input to the DTMF receiver 9 via the mode switch 6 and then to the controller 11. In the controller 11, the received message is analyzed based on the input from the DTMF receiver 9 and stored in the memory 14 while it is displayed with the display 13.

Figure 2:
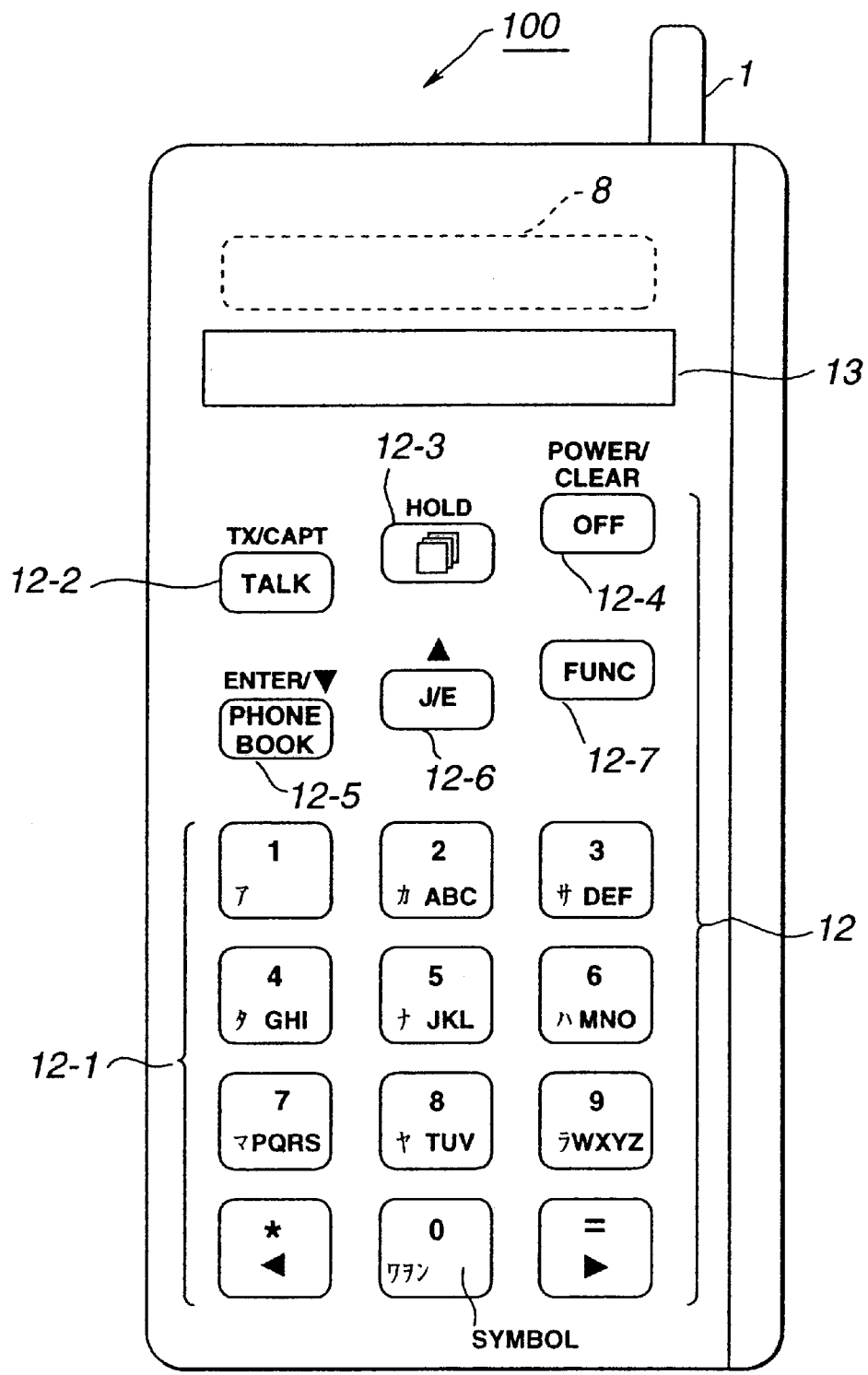
FIG. 2 illustrates the front view of the apparatus shown in FIG. 1.

FIG. 2 shows the front view of the mobile terminal 100 shown in FIG. 1. In FIG. 2, the key matrix 12 comprises a dial key pad 12-1 having the function of a ten key pad for inputting called party's telephone number, etc. and also having the function for inputting message data, etc.; a talk key 12-2 operated during transmission/capture; a hold key 12-3 operated when putting a call on hold state; a power key 12-4 for turning on/off the power or clearing data; an enter key 12-5 for entering telephone directory information according to the telephone directory function realized with the mobile terminal 100; a J/E key 12-6 for selecting Japanese alphabet or English alphabet to be used when inputting message data using the dial key pad 12-1; and a function key 12-7 for selecting various functions.

The display 13 comprises a display device such as an LCD display (liquid crystal display), to display received message data, etc.

Figure 3:
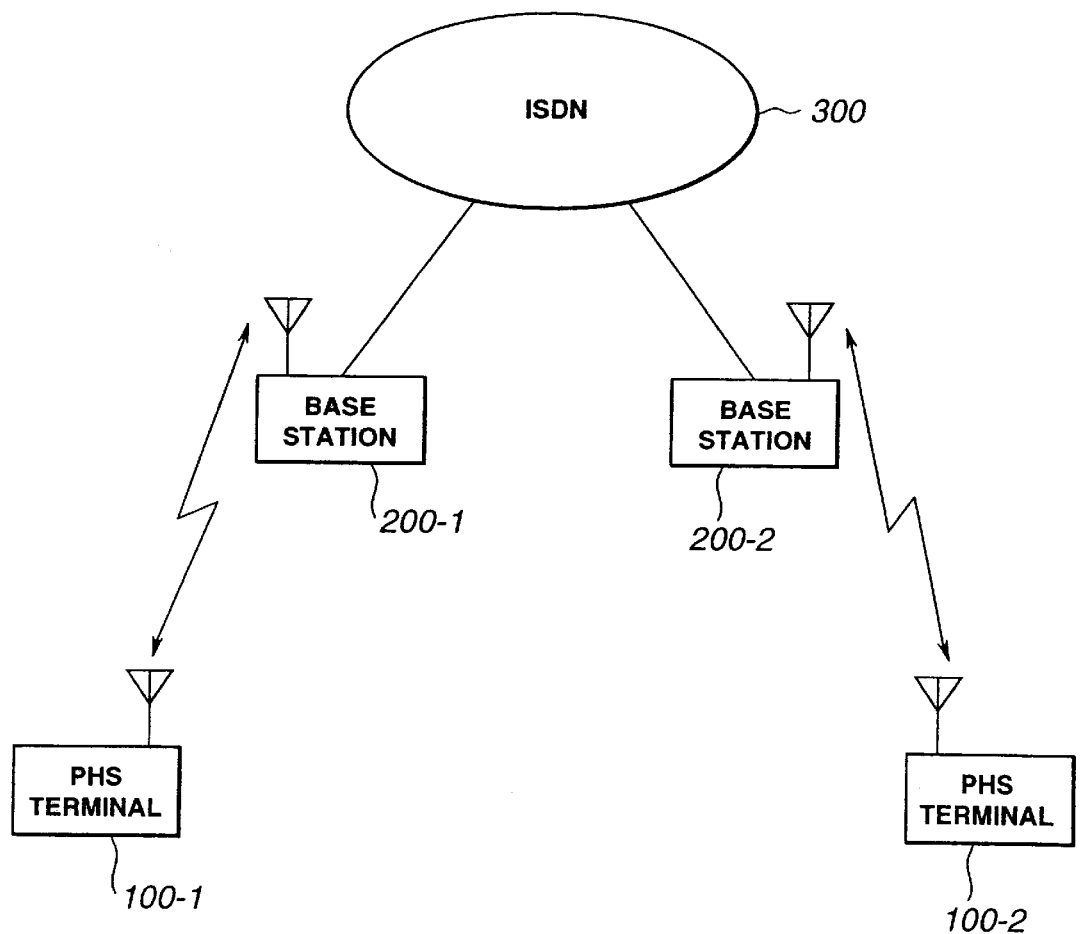
FIG. 3 illustrates an overall configuration of a communication system that effects voice and message communication, etc., using the apparatus shown in FIGS. 1 and 2.

FIG. 3 shows the overall configuration of a communication system to effect voice and message communication, etc., using the mobile terminal shown in FIGS. 1 and 2.

In FIG. 3, PHS terminals 100-1 and 100-2 are the mobile terminal 100 shown in FIGS. 1 and 2.

In the communication system shown in FIG. 3, the PHS terminals 100-1 and 100-2 are connected to an ISDN network (integrated services digital network) via PHS base stations 200-1 and 200-2 so as to effect communication of voice and messages, etc. to each other by way of the base stations 200-1 and 200-2 and the ISDN network 300.

Figure 4:
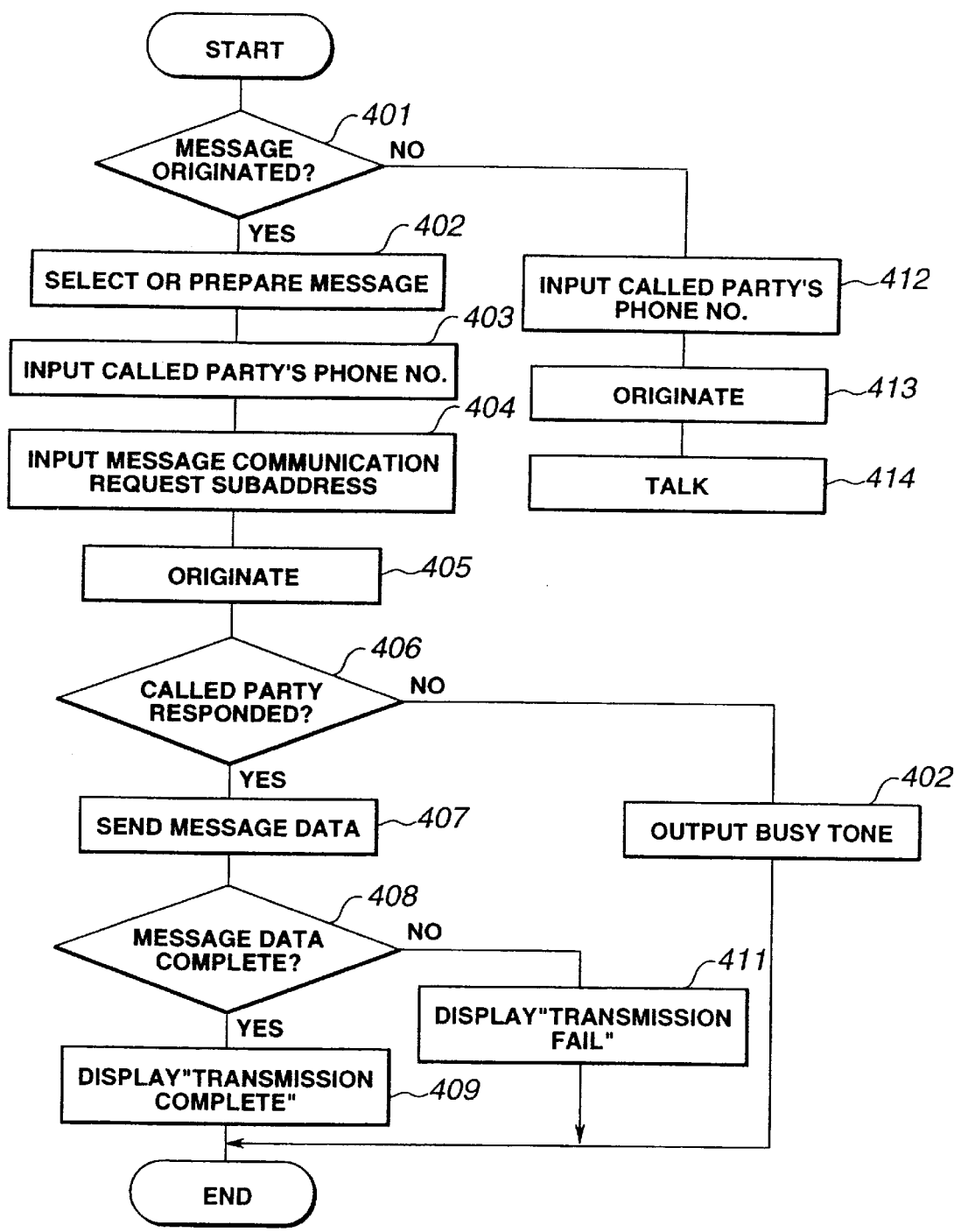
FIG. 4 is a flowchart illustrating the origination process in the message communication using the apparatus shown in FIGS. 1 and 2.

FIG. 4 shows a flowchart illustrating the call origination processing of the controller 11 in effecting the voice and message communications in the communication system shown in FIG. 3.

The mobile terminal 100 (PHS terminal 100-1 or 100-2), which is connected to the ISDN network 300 as shown in FIG. 3, transmits call setting information via the ISDN network 300 when originating a call.

In this embodiment, in conducting the message communication, the information indicating that the communication is the message communication (below this is called "message communication request subaddress") is set in the destination subaddress of the call setting information.

The message communication request subaddress set in the destination subaddress of the call setting information includes, 1) Information instructing whether the called terminal responds automatically (below called "autoresponse command"), and 2) Information instructing whether the called terminal sounds incoming signal tone (below called "incoming signal tone sounding command")

Whether to set the message communication request subaddress in the destination subaddress of the call setting information and whether the autoresponse command or the incoming signal tone sounding command is included in the message communication request subaddress can be set by the operation of the key matrix 12 shown in FIGS. 1 and 2.

In the call origination process shown in FIG. 4, it is checked whether the call origination is intended to the message communication, that is, whether the origination is message origination (Step 401).

To effect the message communication, the operation mode of the mobile terminal 100 is switched to the message mode with the key matrix 12, for example, by pressing the "4" and "1" keys in the dial key pad 12-1 in this order. Then, indication that the terminal is in the message mode is displayed in the display 13. Consequently, in Step 401, it is determined whether the terminal is switched to the message mode.

When the call origination is determined not to be message origination in Step 401 (NO in Step 401), the origination is processed as if the origination was aimed at usual voice communication.

In other words, called party's telephone number is input using the dial key pad 12-1 in the key matrix 12 (Step 412), and then sent by pressing the talk key 12-2 (Step 413) and the terminal changes to the state of voice communication with the called party (Step 414).

When the call origination is determined not to be the message origination, the controller 11 does not set the message communication request subaddress in the destination subaddress of the call setting information sent to the ISDN network 300 via the transmitter 2 when originating a call.

When the call is determined to be the message origination in Step 401 (YES in Step 401), then selection or preparation of a message to be transmitted is effected (Step 402).

The message to be transmitted in this embodiment is obtained with one of the following two methods:

1) Selecting a desired message from a plurality of messages prepared in advance.

2) Inputting a desired message using the dial key pad 12-1 and the J/E key 12-6 in the key matrix 12.

The message selection shown in 1) or the message preparation shown in 2) is effected in Step 402.

Next, the called party's telephone number is input using the dial key pad 12-1 in the key matrix 12 (Step 403). Then, because the call is the message origination, the preset subaddress for message communication (message communication request subaddress) is input to the destination subaddress of the call setting information to be transmitted to the ISDN network 300 when the call is originated (Step 404).

Since the input of the message communication request subaddress is effected automatically when the terminal is switched to the message mode, the user can effect message communication without being conscious at all of the subaddress input.

The message communication request subaddress is constituted so that it can include the autoresponse command and/or the incoming signal tone incoming command. When the autoresponse command or the incoming signal tone sounding command is preset by the operation of the key matrix 12, the message communication request subaddress including the autoresponse command or the incoming signal tone incoming command is input to the destination subaddress of the call setting information in the Step 404.

When the talk key 12-2 of the key matrix 12 is pressed in this state, call origination is effected by transmitting the call setting information wherein the message communication request subaddress is set in the destination subaddress via the transmitter 3 to the ISDN network 300 (Step 405).

Next, it is checked whether the called party responded (Step 406). When it is found that the called party responded, the message data corresponding to the message selected or prepared in Step 402 is transmitted (Step 407).

Then, it is checked whether the transmission of the message data was completed normally (Step 408). When completed normally (YES in Step 408), the transmission complete display is effected on the display 13 (Step 409) and the origination process is complete.

When it is found that the called party did not respond in Step 406 (NO in Step 406), a busy tone is output assuming that the called party is busy (Step 410) and the origination process ends.

When it is determined that the transmission of the message data was not completed normally in Step 408 (NO in Step 408), the transmission failed display is effected on the display 13 (Step 411) and the origination process ends.

Figure 5:
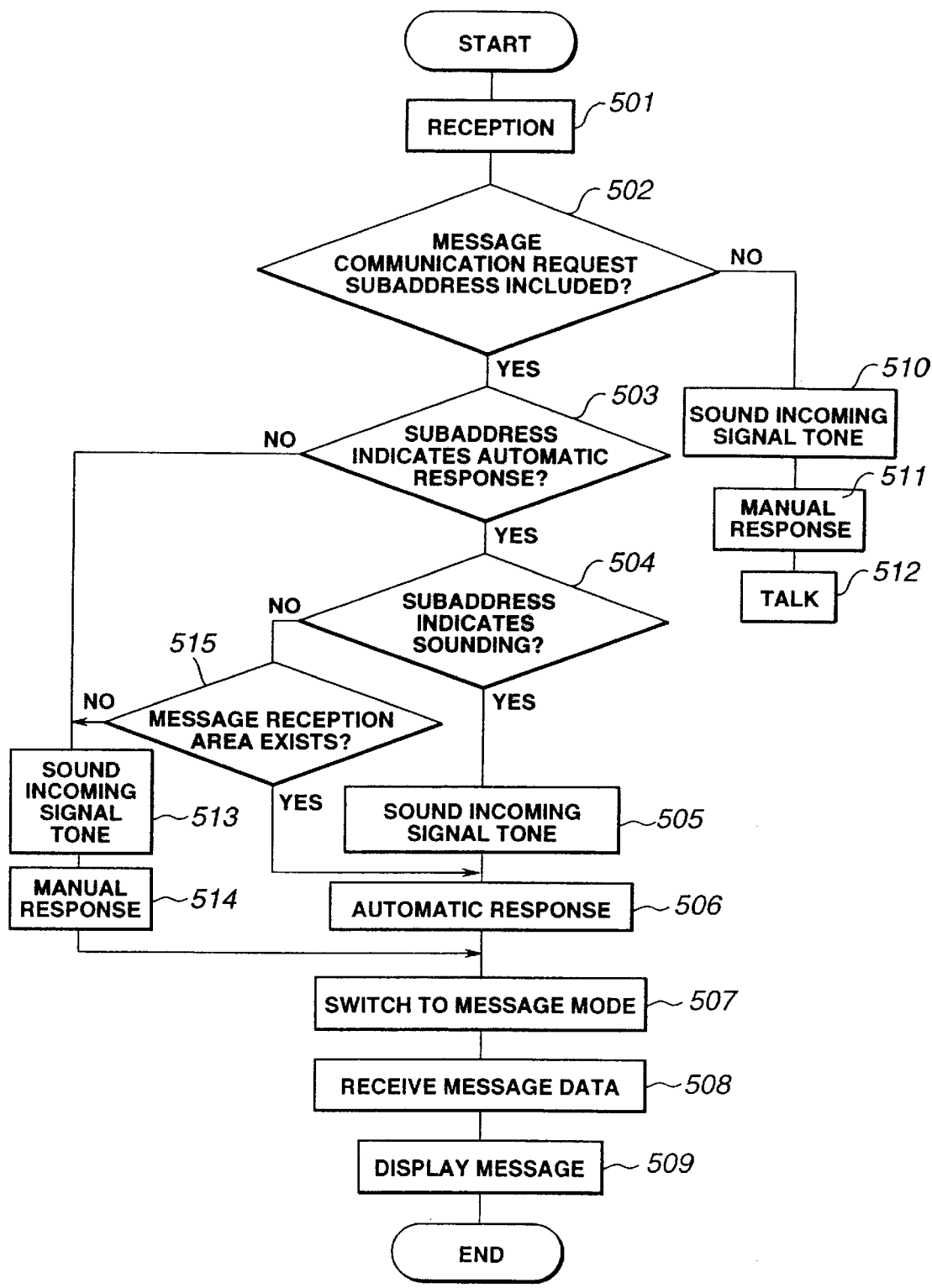
FIG. 5 is a flow chart illustrating the reception process in the message communication using the apparatus shown in FIGS. 1 and 2.

FIG. 5 shows a flowchart illustrating the call reception process of the controller 11 in effecting message communication via the ISDN network 300 shown in FIG. 3 using the mobile terminal 100 shown in FIGS. 1 and 2.

In the call reception process shown in FIG. 5, when there is an incoming signal from the ISDN network 300, it is checked whether the message communication request subaddress is in the destination subaddress of the call setting information received from the ISDN network 300 (Step 502).

When no message communication request subaddress is found in the destination subaddress of the call setting information (NO in Step 502), the call reception is the call reception in the voice communication. Therefore, the incoming signal tone sounds from the sounder 10 (Step 510). In response to the sounding of the incoming signal tone, a manual response is made by pressing the talk key 12-2 of the key matrix 12 (Step 511) so as to move to a state of voice communication with the called party (Step 512).

In this state, the mode switch 6 shown in FIG. 1 is switched to the speaker 8 by a signal, not shown, from the controller 12 and voice communication using the microphone 7 and the speaker 8 becomes possible.

When the message communication request subaddress is found in the destination subaddress of the call setting information (YES in Step 502), it is then checked whether the subaddress indicates the sound instruction, that is, the subaddress includes the autoresponse command (Step 503). When the autoresponse command is included (YES in Step 503), it is next checked whether the message communication request subaddress includes the incoming signal tone sounding command (Step 504).

When the subaddress indicates the sound instruction (YES in Step 504), the incoming signal tone sounds from the sounder 11 (Step 505) and then an automatic response to the incoming signal is made (Step 506) and switching to the message mode is effected with the mode switch 6 being switched to the DTMF receiver 9 by a signal, not shown, from the controller 11 (Step 507).

Since this reception is the message reception aimed at message communication, in order to notify this, the sounding of the incoming signal tone may have tone and frequency which are different from those in the responding of the incoming signal tone for the reception aimed at voice communication in Step 510. If the sounder 10 is a vibrator, notification of the incoming signal may be made with a vibration which is different from the vibration for the incoming signal of usual communication.

Moreover, when it is determined that the subaddress is not the sound instruction, specifically it does not include the incoming signal tone sounding command (NO in Step 504), the autoreception is effected without the sounding of the incoming signal tone (Step 506) and switching to the message mode is effected with the mode switch 6 being switched to the DTMF receiver 9 side by the signal, not shown, from the controller 11 (Step 507).

When it is determined that the memory 14 has no message reception area to store the received message in Step 515 (NO in Step 515), the incoming signal tone sounds from the sounder 10 (Step 513) and in response to the sounding of the incoming signal tone, when a manual response is made by pressing the talk key 12-2 of the key matrix 12 (Step 514), switching to the message mode is effected with the mode switch 6 being switched to the DTMF receiver 9 side by the signal, not shown, from the controller 11 (Step 507).

When it is determined that the memory 14 has no message reception area to store the received message in Step 515 (NO in Step 515), the process moves to Step 510 and the voice communication is effected.

Moreover, when it is determined that the subaddress is not the autoresponse instruction, in other words the autoresponse command is not included in Step 503 (NO in Step 503), the incoming signal tone sounds from the sounder 10 (Step 513) and when a manual response is made in response to the sounding of the incoming signal tone by pressing the talk key 12-2 of the key matrix 12 (Step 514), switching to the message mode is effected with the mode switch 6 being switched to the DTMF receiver 9 side by the signal, not shown, from the controller 11 (Step 507).

When the mode switch 6 is switched to the DTMF receiver 9 side, reception of the message data becomes possible and, with the terminal in this state, message data transmitted from the calling party via the ISDN network 300 is received (Step 508).

As discussed above, this embodiment is constituted so that the message data may be received as a DTMF signal.

Consequently, during the reception of message data, the reception of message data is effected as follows. Namely, the message data is received with the antenna 1 as digital information corresponding to a DTMF signal, the digital information corresponding to the DTMF signal is input to the voice codec 5 via the receiver 4, the digital information is converted to a DTMF signal at the voice codec 5, and the DTMF signal is input to the DTMF receiver 9 via the mode switch 6.

Then, the DTMF signal undergoes a reception process in the DTMF receiver 9, and is input to the controller 11. In the controller 11, the message received is analyzed based on the input from the DTMF receiver 9. The message is displayed on the display 13 while the it is stored in the memory 14 (Step 509), and the call reception process is complete.

Figure 6:
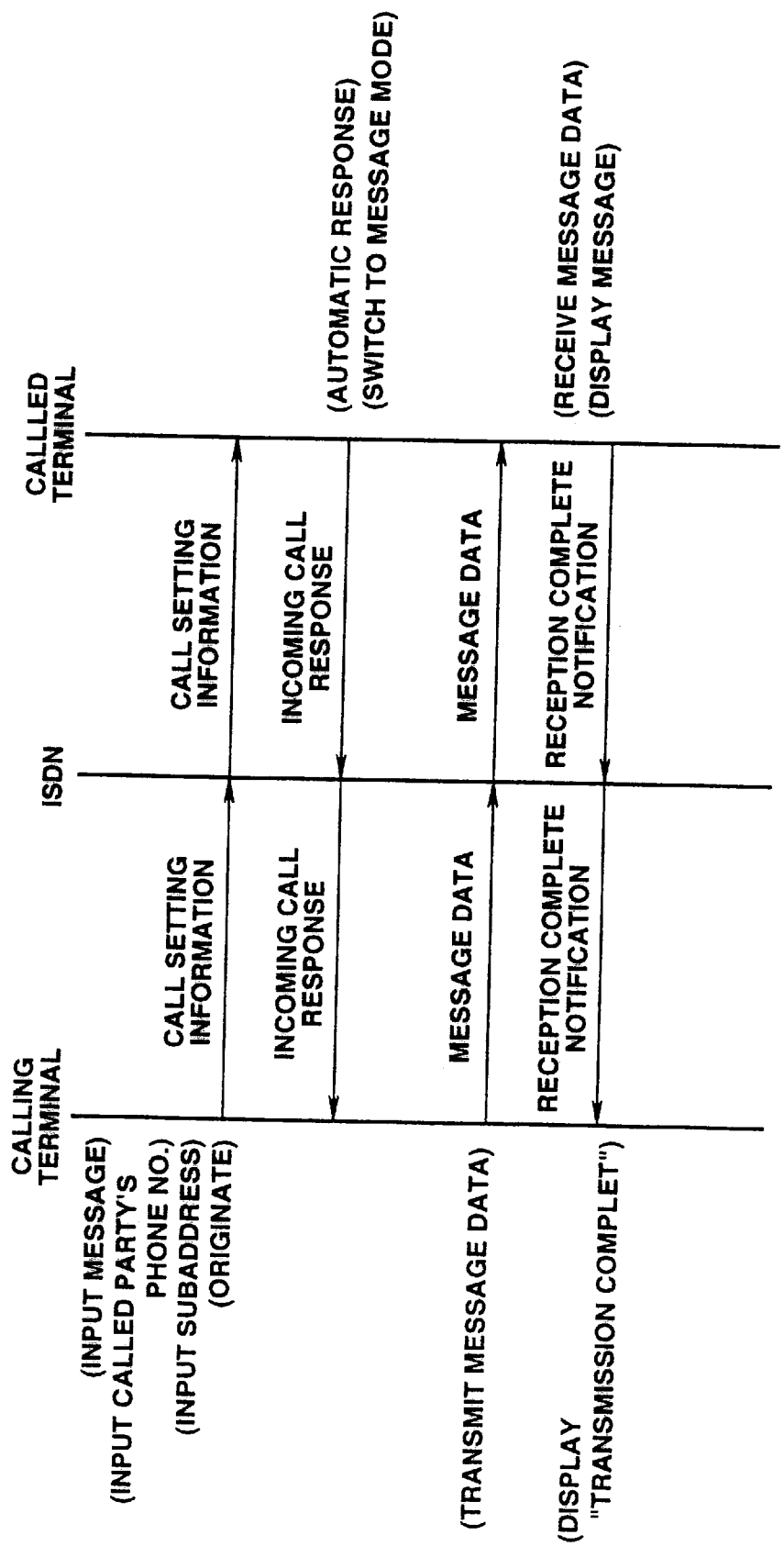
FIG. 6 is a sequence chart illustrating the operations of the calling terminal and the called terminal in the message communication according to the present invention.

FIG. 6 shows a sequence chart of the action of the calling terminal and the called terminal in the message communication. This sequence chart shows the case where the message communication request subaddress including only the autoresponse command is set in the destination subaddress of the call setting information.

Before the message communication, the input of the message, input of called party's phone number, and input of subaddress including autoresponse command are effected in the calling terminal. Here, message input may be effected by selecting a message prepared and stored in advance through operating the key matrix 12. Also, the input of the subaddress may be effected by inputting the subaddress through actual operation of the key matrix 12 or by automatic input of a preset subaddress.

When origination is effected by pressing the talk key 12-2 of the key matrix 12 with the terminal in this state, the call setting information, wherein the message communication request subaddress including the autoresponse command is set in the destination subaddress, is transmitted from the calling terminal to the ISDN network 300. Then, the call setting information is transmitted via the ISDN network 300 to the called terminal.

In the called terminal, the message communication request subaddress including the autoresponse command set in the destination subaddress of the call setting information, which was received from the ISDN network 300, is detected, autoresponse is made, the incoming signal response is transmitted to the calling terminal via the ISDN network 300, and switching to the message mode is effected by switching the mode switch 6 automatically to the DTMF receiver 9 side.

The calling terminal, which received the incoming signal response from the called terminal, transmits message data corresponding to the message input in advance of message communication to the called terminal via the ISDN network 300. The message data is effected with digital data corresponding to the DTMF signal.

In the called terminal, the message data transmitted from the calling terminal is received as a DTMF signal by the DTMF receiver 9 via the voice codec 5, message display based on the output of the DTMF receiver 9 is effected on the display 13, and the reception complete notification is effected for the calling terminal via the ISDN network 300.

In the calling terminal, transmission complete display is effected on the display 13 when the reception complete notification is received via the ISDN network 300, and the transmission of the message data is complete.

This embodiment is constituted so that the message communication request subaddress is set in the destination subaddress of the call setting information, but may also be constituted so that the message communication request subaddress is set in the origination subaddress of the call setting information or set in some other writable information.

In this embodiment, message data is transmitted from a calling terminal to a called terminal, but the present invention may also be constituted to effect the exchange of message data between a calling terminal and a called terminal.

Figure 7:
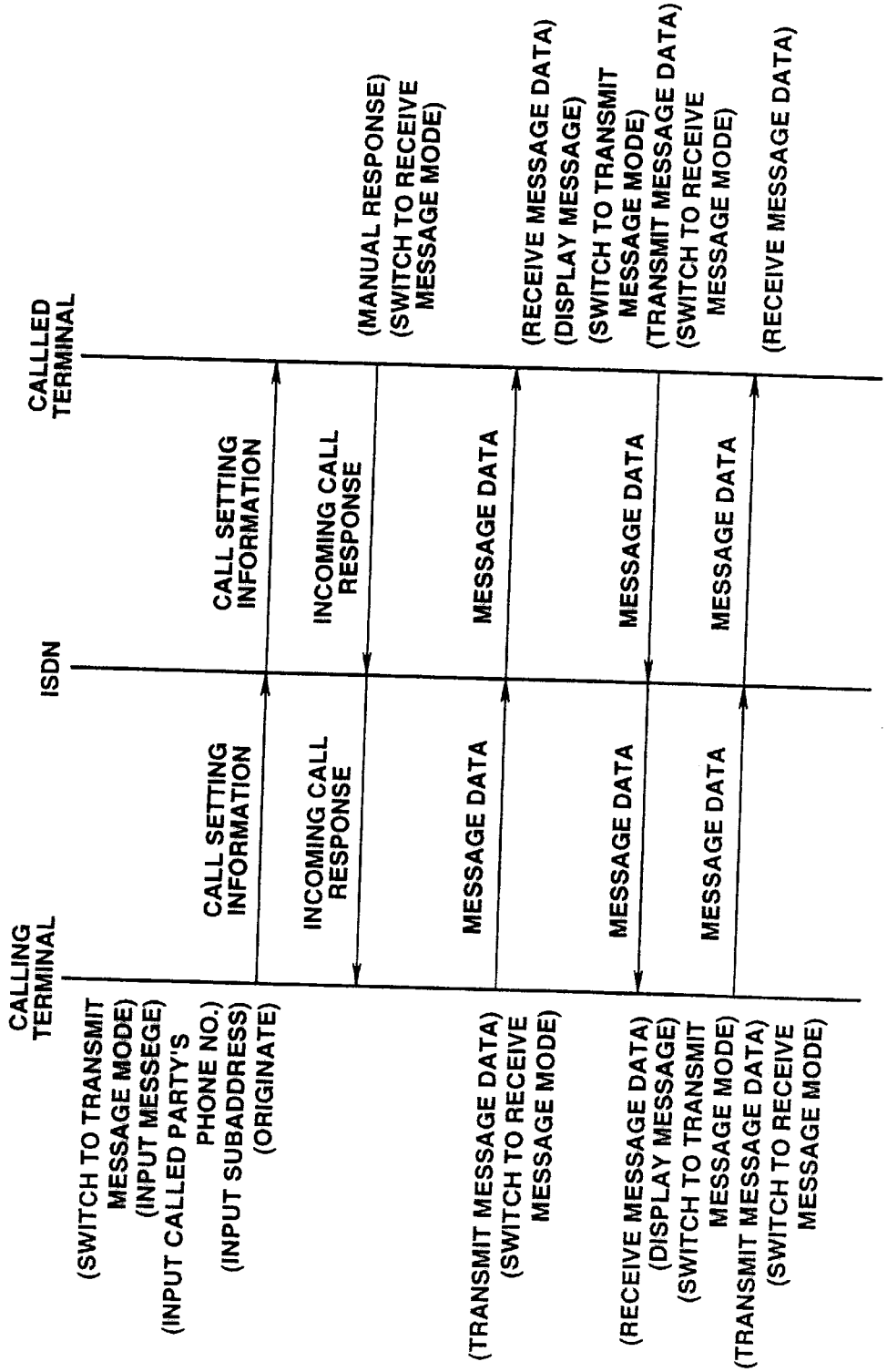
FIG. 7 is a sequence chart illustrating the operations of the calling terminal and the called terminal in the message exchange communication according to the present invention.

FIG. 7 shows a sequence chart of the action of the calling terminal and the called terminal in the case of effecting the exchange of message data between a calling terminal and a called terminal.

In this case, the calling terminal is constituted so that it is switched to the message exchange mode when the function key 12-7 and the "4" and "3" keys of the dial key pad 12-1 are pressed in this order.

When the calling terminal enters the message exchange mode, the calling terminal is switched to the message transmission mode and the input of the message, the called party's phone number, and the subaddress including the autoresponse command is effected. Here, the message may be input by the selection of a previously prepared message by the operation of the key matrix 12. Also, it may be constituted so that the input of the subaddress is effected through inputting the subaddress by actual operation of the key matrix 12 or by automatic input of a preset subaddress.

When origination is effected with the terminal in this state by pressing the talk key 12-2 of the key matrix 12, the call setting information where message communication request subaddress, including the information indicating message exchange, is set in the destination subaddress is transmitted to the ISDN network 300 from the calling terminal. The call setting information is transmitted to the called terminal via the ISDN network 300.

In the called terminal, the message communication request subaddress, including the information indicating message exchange and which is set in the destination subaddress of the call setting information, is detected and the incoming signal tone is generated. When the incoming signal tone is manually responded by pressing the talk key 12-2 of the key matrix 12 on the called terminal, an incoming signal response is sent to the calling terminal from the called terminal via the ISDN network 300. At that time, the called terminal enters message reception mode with the automatic switching of the mode switch 6 to the DTMF receiver 9 side.

When the calling terminal receives the incoming signal response from the called terminal, the calling terminal transmits message data via the ISDN network 300 to the called terminal. When the transmission of the message data is complete, the calling terminal enters the message reception mode with the automatic switching of the mode switch 6 to the DTMF receiver 9 side.

When the called terminal receives this message data, a message display corresponding to the message data is effected with the display 13. Then, a response message responding to the message displayed on the display 13 is input and message data corresponding to the response message is transmitted via the ISDN network 300 to the calling terminal.

The input of the message to the called terminal may be effected through actual operation of the key matrix 12 or by the selection of a previously input message through the operation of the key matrix 12. The called terminal enters the message reception mode with the automatic switching of the mode switch 6 to the DTMF receiver 9 side.

When the calling terminal receives the message data from the called terminal, a message display corresponding to the message data is effected with the display 13.

In transmitting a message from the calling terminal to respond to the message displayed on the display 13, the calling terminal switches its mode to message transmission mode and then a response message responding to the message displayed on the display 13 is input and message data corresponding to the message is transmitted via the ISDN network 300 to the called terminal. When the transmission of the message data is complete, the calling terminal enters the message reception mode.

When the called terminal receives the message data, a message display corresponding to the message data is effected with the display 13.

In this way, the exchange of message data can be effected between a calling terminal and a called terminal through repeated reception and transmission of message data between a calling terminal and a called terminal.

What is claimed is:

1. A method for message communication in which communication of message data is effected between a calling terminal and a called terminal connected to each other through an integrated services digital network, wherein:

the calling terminal adds control information indicating that message communication is effected to call setting information sent to the integrated services digital network when the message communication is effected between the calling terminal and the called terminal; and the called terminal automatically switches its communication mode to a voice mode to effect voice communication with the called terminal after responding to the call setting information when the control information is not added to the call setting information that has been received from the integrated services digital network, and automatically switches its communication mode to a message reception mode to automatically receive the message data transmitted from the called terminal after responding to the call setting information when the control information is added to the call setting information.

2. The method for message communication according to claim 1, wherein, in the message mode to transmit message data from the calling party to the called terminal, the calling terminal converts the message data to a DTMF signal and transmits the DTMF signal to the called terminal; and the called terminal analyzes the DTMF signal received from the calling terminal and reconverts the BTMF signal to the message data.

3. The method for message communication according to claim 1, wherein the control information is set in a subaddress of the call setting information.

4. The method for message communication according to claim 1, wherein the control information includes automatic response information to indicate whether or not automatic response is made to the call setting information; and the called terminal automatically responds to the call setting information when it determines that the automatic response information indicates that automatic response should be made.

5. The method for message communication according to claim 1, wherein the control information includes incoming signal notification information to indicate whether or not to make notification of an incoming signal in response to the reception of the call setting information; and the called terminal controls incoming signal notification when it determines that the incoming signal notification information indicates that notification of an incoming signal should be made.

6. The method for message communication according to claim 5, wherein the notification of the incoming signal for the message communication is effected in a manner different from a manner for effecting the notification of an incoming signal for the voice communication.

7. The method for message communication according to claim 1, wherein the calling terminal is a mobile terminal connected through a radio channel to base station connected to the integrated services digital network.

8. The method for message communication according to claim 1, wherein the called terminal is a mobile terminal connected through a radio channel to the base station connected to the integrated services digital network.

9. A method for message communication in which communication of message data is effected between a calling terminal and a called terminal connected to each other through an integrated services digital network, wherein:

the calling terminal adds control information indicating that message communication is effected to call setting information sent to the integrated services digital network when the message communication is effected between the calling terminal and the called terminal;

the called terminal, upon receiving the call setting information from the integrated services digital network, automatically switches its communication mode to the message reception mode to automatically receive message data sent from the calling terminal;

the calling terminal, upon receiving the incoming call response from the called terminal, transmits message data to the called terminal, and automatically switches its communication mode to the message reception mode; and the called terminal, after receiving the message data from the calling terminal, automatically switches its communication mode to the message transmission mode and transmits message data to the calling terminal.

10. An apparatus for message communication in which communication of message data is effected between a calling terminal and a called terminal connected to an integrated services digital network to effect the communication of message data via the integrated services digital network, comprising:

communication mode determining means for determining whether call setting information received from the integrated services digital network includes control information indicating that message communication is effected between the calling terminal and the called terminal, wherein the calling terminal adds the control information; and switching means for automatically switching communication mode of the apparatus to a voice mode to effect voice communication with the called terminal after responding to the call setting information when the communication mode determining means determines that the control information is not included in the call setting information, and for automatically switching the communication mode to a message mode to automatically receive message data when it is determined that the control information is included.

11. The apparatus for message communication according to claim 10, wherein the control information is set in a subaddress of the call setting information.

12. The apparatus for message communication according to claim 10, wherein the message data is automatically received, stored in storage means and displayed on display means when the switching means switches the communication mode to the message mode.

13. The apparatus for message communication according to claim 10, wherein the control information comprises automatic response information for indicating that the call setting information is automatically responded.

14. The apparatus for message communication according to claim 10, wherein the control information comprises incoming signal notification information for indicating whether or not notification of an incoming call is made in response to the call setting information, and wherein the apparatus further comprises incoming call notification control means for controlling notification of the incoming signal according to determination by the communication mode determining means on the incoming signal notification information included in the control information.

15. A mobile terminal connected to an integrated services digital network in which communication of message data is effected between a calling terminal and a called terminal to effect the communication of message data via the integrated services digital network, comprising:

communication mode determining means for determining whether call setting information received from the integrated services digital network includes control information indicating that message communication is effected between the calling terminal and the called terminal, wherein said calling terminal adds said control information; and switching means for automatically switching communication mode of the apparatus to a voice mode to effect communication with the called terminal after responding to the call setting information when the communication mode determining means determines that the control information is not included in the call setting information, and for automatically switching the communication mode to a message mode to automatically receive message data when it is determined that the control information is included.

16. The mobile terminal according to claim 15, wherein the control information is set in a subaddress of the call setting information.

17. The mobile terminal according to claim 15, wherein the message data is automatically received, stored in storage means and displayed on display means when the switching means switches the communication mode to the message mode.

18. The mobile terminal according to claim 15, wherein the control information comprises automatic response information for indicating that the call setting information is automatically responded.

19. The mobile terminal according to claim 15, wherein the control information comprises incoming signal notification information for indicating whether or not notification of an incoming call is made in response to the call setting information, and wherein the apparatus further comprises incoming call notification control means for controlling notification of the incoming signal according to determination by the communication mode determining means on the incoming signal notification information included in the control information.

* * * * *